Feb. 27, 1968     S. MESSERSCHMIDT     3,370,900
ROLLER BEARINGS
Filed March 11, 1966            2 Sheets-Sheet 1
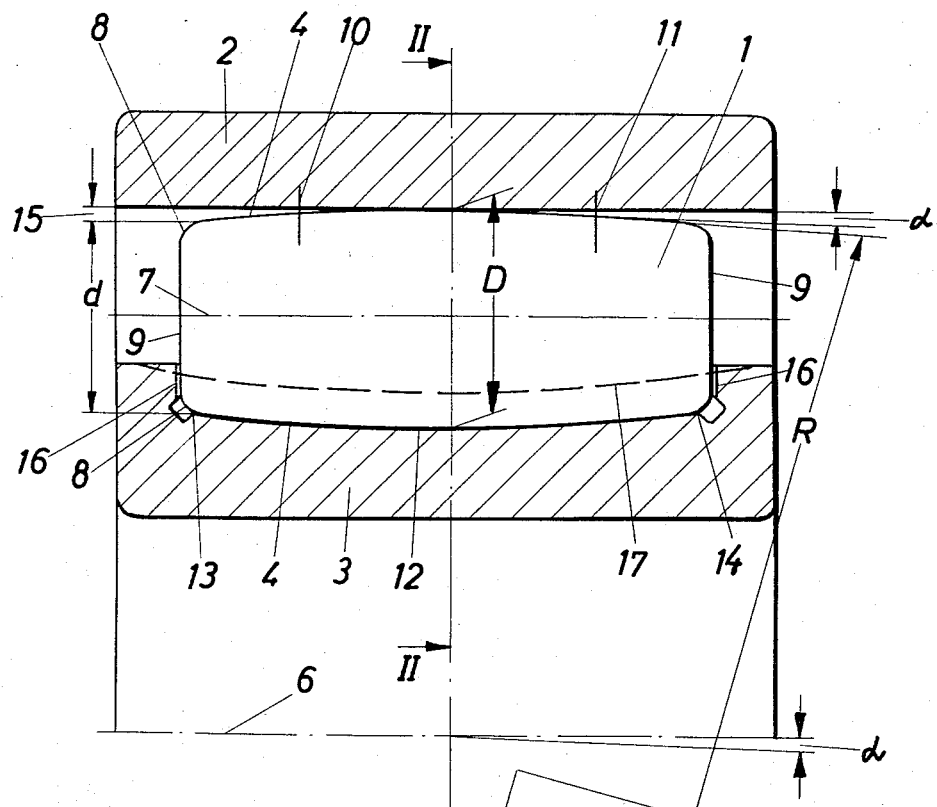
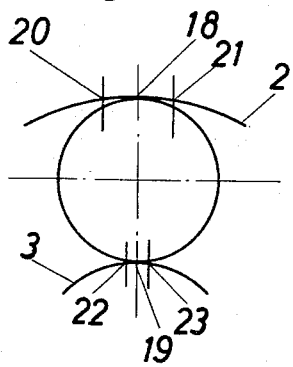
Fig. 2
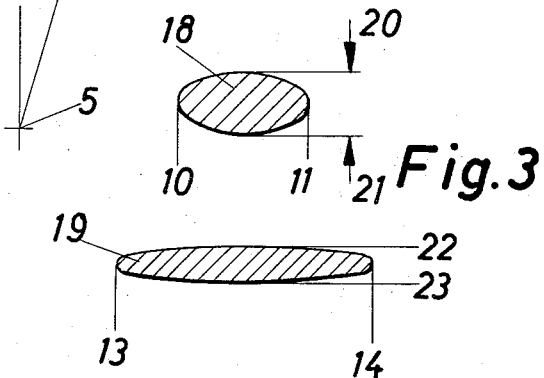
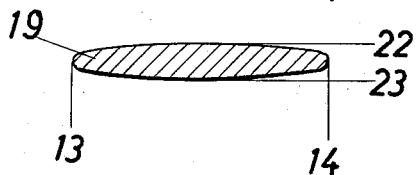
Fig. 3
Fig. 4
INVENTOR.
SEBASTIAN MESSERSCHMIDT
BY Hame and Nydick
ATTORNEYS United States Patent Office 3,370,900
Patented Feb. 27, 1968

3,370,900
ROLLER BEARINGS
Sebastian Messerschmidt, Schonungen, Germany
Filed Mar. 11, 1966, Ser. No. 533,466
Claims priority, application Germany, Mar. 13, 1965,
M 64,523
4 Claims. (Cl. 308—212)

ABSTRACT OF THE DISCLOSURE

A roller bearing in which two race rings are relatively rotatable about a common axis, each of the rings having a working surface in contact with rollers which, in turn, are free to rotate about their common axis. Each of the rollers has a curved surface line in the direction of the rotational axis which conforms to the arc of a radius. The length of the radius is at least twice the distance between the common axis and the roller axis. Each of the roller contacts is engaging substantially equal areas of the working surfaces.

---

This invention relates to roller bearings comprising race rings relatively rotatable about a common axis with rollers retained between the opposed faces of such races.

The manufacture of roller bearings has reached a maximum degree of accuracy with the use of measuring instruments which indicate the fraction of a thousandth of a millimetre. In this way there is obtained a maximum of load capacity, noiselessness and durability.

However in the fitting of such roller bearings nothing near the same degree of accuracy is insisted upon. In particular the tolerances in the machine parts incorporating such roller bearings are substantially greater than those of the bearings themselves. The inaccuracy of the built-in bearing may be increased still further by negligence of the fitter.

Modern roller bearings are however, extraordinarily sensitive to variable stresses and inaccurate fitting, and there is, therefore, a great need for an arrangement which makes the roller bearings substantially insensitive to the greater manufacturing tolerances of the machines or the like receiving them and any negligences in fitting, without however the advantages of the precision of the roller bearing manufacture being lost.

To avoid the sensitivity and limitation of cylindrical roller bearings convex rollers, of so-called barrel-shape are known. With these bearings the centre point of the radius of curvature of the surface line of a roller lies in every case close to the axis of the bearing, which results that for every size of bearing special rollers having to be made. Also the manufacture of such curved rollers requires, due to their pronounced curvature, the use of special machines which increases considerably the manufacturing costs of such bearings.

Now therefore the object of the present invention is to provide a roller bearing with the advantages of the cylindrical roller bearing as to load capacity, noiselessness and durability and those of convex roller bearings in accepting the greater tolerances of the machines or the like incorporating the same but without the limitations and high manufacturing cost of the latter.

It is also an object of the present invention to provide roller bearing having convex surface line rollers with such small arc of curvature as to obtain the advantages of cylindrical rollers and barrel shape rollers without the disadvantages and limitations of either such known type of roller.

Another object of the invention is to so shape at least one of race rings to retain the rollers in position between the races.

With the foregoing and other objects in view the surface line of the rollers in axial direction is according to the present invention curved according to a radius the length of which is at least twice the length of the bearing radius and the surfaces of the rollers bear on the two race rings with at least approximately equal areas. The curvature of the surface line is such that the diameter of the rollers is tapered towards both ends only so much that with certainty any possible transpositioning of the roller body upon axial displacement, oblique fitting or the like are obviated. By a multiple of the radius of the bearing may be understood, for example, three to thirty times. By the "radius of the bearing" is to be understood the radial distance between the axis of the bearing and the axis of the rollers or the midpoint thereof.

For practical purposes for all but the smaller and larger sizes of bearings, a single radius of curvature for the curvature line of the rollers may be used. For abnormally long rollers, namely needles, it may be expedient to choose a much larger radius of curvature. With such a large radius of curvature for the surface of the rollers, the bodies may be ground directly (like the cylindrical rollers) on centreless grinding machines and by the usual continuous procedure. Compared with cylindrical rollers the slightly convex roller has special advantages that in manufacturing control the measurement of the conicity is rendered unnecessary which further reduces the cost of manufacture.

The bearing of the rollers approximately equally on the outer ring and on the inner ring is of special advantage compared with the normal cylindrical roller bearings in which a smaller bearing surface with respect to the inner ring is decisive for the loadability of the bearing, as then the theoretical loadability with the same outer dimensions of the bearing can be compared to that of the hitherto normal roller bearings. This is particularly so when the inner ring has a curved working surface, the axial cross-section of which substantially corresponds to the curvature of the surface line of the rollers, as then the rollers can bear practically throughout their whole length on both of the races.

The inner race may have a peripheral guide on both sides for preventing displacement of the rollers. An alternative arrangement may have only one such guide for the rollers.

Instead of having such guide or guides, the curved working surface of the inner race may extend beyond the axial length of the rollers and to beyond both ends thereof.

The invention is applicable to the most varied types of roller bearings in which hitherto cylindrical roller members have been used, namely radial bearings, conical bearings, needle bearings and so on.

The invention is by way of example hereinafter more fully described and illustrated in the accompanying drawings, in which:

FIG. 1 shows a cross-section through one half of a roller bearing;

FIG. 2 shows a simplified radial section approximately on the line II—II of FIGURE 1;

FIG. 3 shows the bearing surface of the rollers on the outer ring;

FIG. 4 shows the bearing surface of the rollers on the inner ring;

Figures 5, 6:
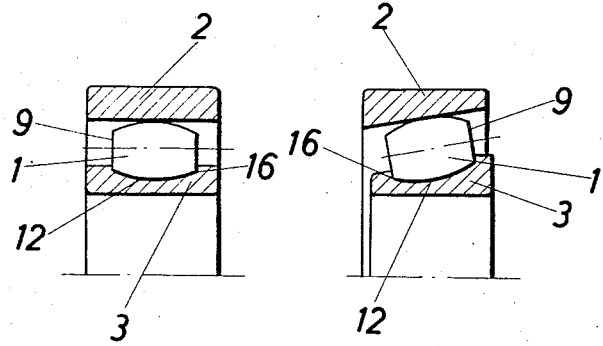
FIGS. 5, 6, 7, 8 and 9 show the use of the invention in a crosswise bearing, conical bearing, needle bearing. axial pressure bearing and taper bearing respectively.

The bearing according to FIG. 1 is, for better clarification of the invention, illustrated as one with comparatively long roller members. These are formed slightly convex and in fact they taper from the largest diameter D in their middle towards both ends of the diameter d. The roller 1 runs between the outer ring 2 and the inner ring 3 of the bearing and its surface line 4 in the direction of its rotational axis is curved on a radius R around a point 5, which lies a substantial distance beyond the bearing axis 6 as, illustrated. The length of this radius R is at least twice the length of the bearing radius, being for example eight times the length thereof, and by the radius of the bearing is to be understood the distance between the rotational axis of the roller 7 and that of the bearing axis 6. The curvature of the surface line 4 passes at 8 by rounding off into the flat end face 9.

In consequence of the length of the radius R for the curved surface line 4 of the roller 1, the axial end points 10 and 11 of the area of pressure of the roller 1 on the outer ring 2 shown in FIG. 1 and FIG. 3 are comparatively far apart from one another, and in fact the length of the section 10-11 is substantially in direct dependence on the length of the radius R.

The inner ring 3 of the roller bearing has a concavely curved working surface or recess 12, the cross-section of which corresponds substantially to the curvature of the surface line 4 of the roller. The roller 1 thus receives an area of pressure over its whole axial length 13-14 (see FIG. 4). As the depth of the recess is greater than the difference 15 between the half diameters D and d of the roller 1 this roller receives on its front faces 9 a guiding by means of the peripheral side cheeks 16 of the inner ring 3. The recess 12 of the inner race may however correspond also in its axial length approximately to the length of the roller 1 so that the axial guiding on the front face 9 by means of the projections 16 can be dispensed with. This applies also to such a recessed race worked into the inner race 3 which race is indicated at 17 in FIG. 1. This runs on both sides of the end faces 9 of the roller members 1.

FIG. 2 shows the proportions of the width of the bearing surfaces 18 in respect of the outer ring 2 and the bearing surfaces 19 in respect of the inner ring 3, and in fact the bearing surface 18 is limited by the two points 20 and 21 whilst the bearing surface 19 terminates at the two points 22 and 23. The drawing shows that the faces 18 and 19 are approximately the same size. Thus the distance 10-11 is varied with the radius R.

FIG. 5 which corresponds substantially to FIG. 1 shows a shape departing from a normal cylinder roller bearing.

Figures 7, 10:
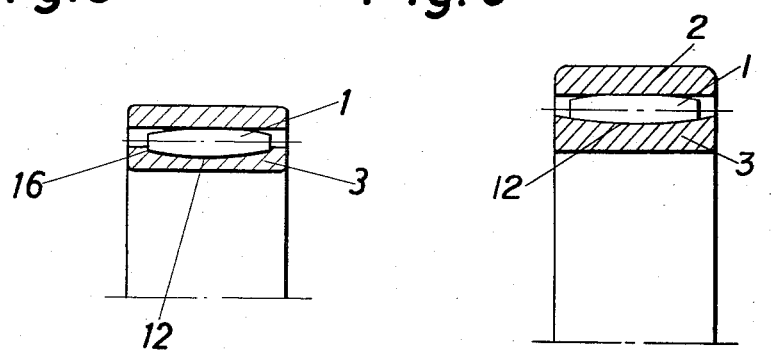
FIG. 10 shows a further modification of the roller bearing.

FIG. 6 shows the arrangement in a conical or taper roller bearing, and FIG. 7, in a needle bearing. In all these cases there is in the inner ring 3 a recess 12 as a race for the roller 1 guided at 16 on the front side 9.

Figures 8, 9:
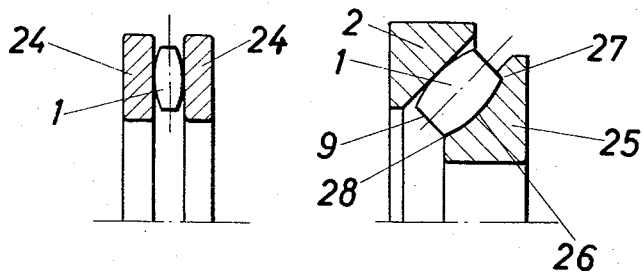

In the construction of an axial pressure bearing according to FIG. 8, one of the two race rings 24 and 25 may be recessed or they may both be recessed or otherwise provided with guide flanges at each end, and in this case the radial distance is the distance from the bearing axis to the midpoint of a roller axis. With the taper bearing according to FIG. 9, the inner ring 25 is provided with a recess 26 as a race for the roller 1 but only one lateral projection 27 for the axial guiding of the roller 1 is present whilst at 28 the recess runs out next to the end face 9 of the roller 1.

FIG. 10 shows an arrangement in which the working surfaces 12 of rings or races 2 and 3 extend beyond the ends of roller 1.

I claim:
1. In a roller bearing comprising two race rings relatively rotatable about a common axis and each having a working face in contact with roller bodies each free to rotate on its own axis, each said roller body having a curved surface line in the direction of its said axis conforming to the arc of a radius the length of which is at least twice the distance between said common axis and said roller axis, and said roller bodies contacting substantially equal areas of working faces.

2. In a roller bearing as claimed in claim 1 in which one race ring is smaller than the other said working face of said smaller ring is convexly curved to substantially the same curvature as said curved surface line of said roller bodies.

3. In a roller bearing as claimed in claim 2 in which said convex curvature of said working face of said smaller ring extends beyond both ends of said roller bodies.

4. In a roller bearing as claimed in claim 2 in which said smaller ring has at least at one side peripheral guide means for preventing axial displacement of said roller bodies.

References Cited

UNITED STATES PATENTS 2,642,322   6/1953   Polmgren _____ 308—212

MARTIN P. SCHWADRON, *Primary Examiner.*

F. SUSKO, *Assistant Examiner.*